United States Patent [19]
Valembois

[11] Patent Number: 5,655,632
[45] Date of Patent: Aug. 12, 1997

[54] DAMPER DEVICE FOR A MECHANICAL SYSTEM

[75] Inventor: Guy Valembois, Blagnac, France

[73] Assignee: Etienne Lacroix Tous Artifices S.A., Muret, France

[21] Appl. No.: 432,132

[22] PCT Filed: Nov. 4, 1993

[86] PCT No.: PCT/FR93/01088

§ 371 Date: May 8, 1995

§ 102(e) Date: May 8, 1995

[87] PCT Pub. No.: WO94/11649

PCT Pub. Date: May 26, 1994

[30] Foreign Application Priority Data

Nov. 6, 1992 [FR] France .................. 92 13428

[51] Int. Cl.$^6$ .................. F16F 1/32; F41A 3/88
[52] U.S. Cl. .................. 188/136; 267/205; 267/214; 89/14.3; 89/44.01
[58] Field of Search .................. 188/129, 166, 188/136, 70 R; 267/205, 134, 214; 89/42.01, 44.01, 44.02, 14.3, 198

[56] References Cited

U.S. PATENT DOCUMENTS

| 2,539,275 | 1/1951 | Sahlin et al. ................ 89/44 |
| 3,783,738 | 1/1974 | Pelat ........................ 89/44 R |
| 4,928,802 | 5/1990 | Weiss et al. ................ 192/56 R |

FOREIGN PATENT DOCUMENTS

| 0 345 537 | 12/1989 | European Pat. Off. . |
| 2127224 | 10/1972 | France . |
| 2 333 165 | 6/1977 | France . |
| 27 51 992 | 5/1979 | Germany . |
| 300 379 | 7/1954 | Switzerland . |
| 907408 | 10/1962 | United Kingdom . |
| 1132119 | 10/1968 | United Kingdom . |

OTHER PUBLICATIONS

Patent Abstracts of Japan; vol. 016, No. 193 (P1349) May 11, 1992 & JP A.04 027 897 (Toshiba Corp) Jan. 30, 1992.

Primary Examiner—Josie Ballato
Attorney, Agent, or Firm—Jacobson, Price, Holman & Stern, PLLC

[57] ABSTRACT

A damper device comprising a first and second assembly suitable for guided relative displacement. The first assembly is supported stationarily with respect to a reference. The second assembly is supported for guided relative displacement with respect to the first assembly and the reference. A driving connection connects the second assembly and a system to be damped. A shoe rests against the first assembly and a resilient control that works in buckling is interposed between the shoe and the second assembly. The resilient control exerts a force on the shoe tending to urge the shoe against the first assembly during an active stage of damper device loading, corresponding to relative displacement in a first direction between the first and second assemblies and to reduce the force exerted by the shoe during a passive stage of damper device loading corresponding to relative displacement in a second direction between the first and second assemblies.

63 Claims, 7 Drawing Sheets

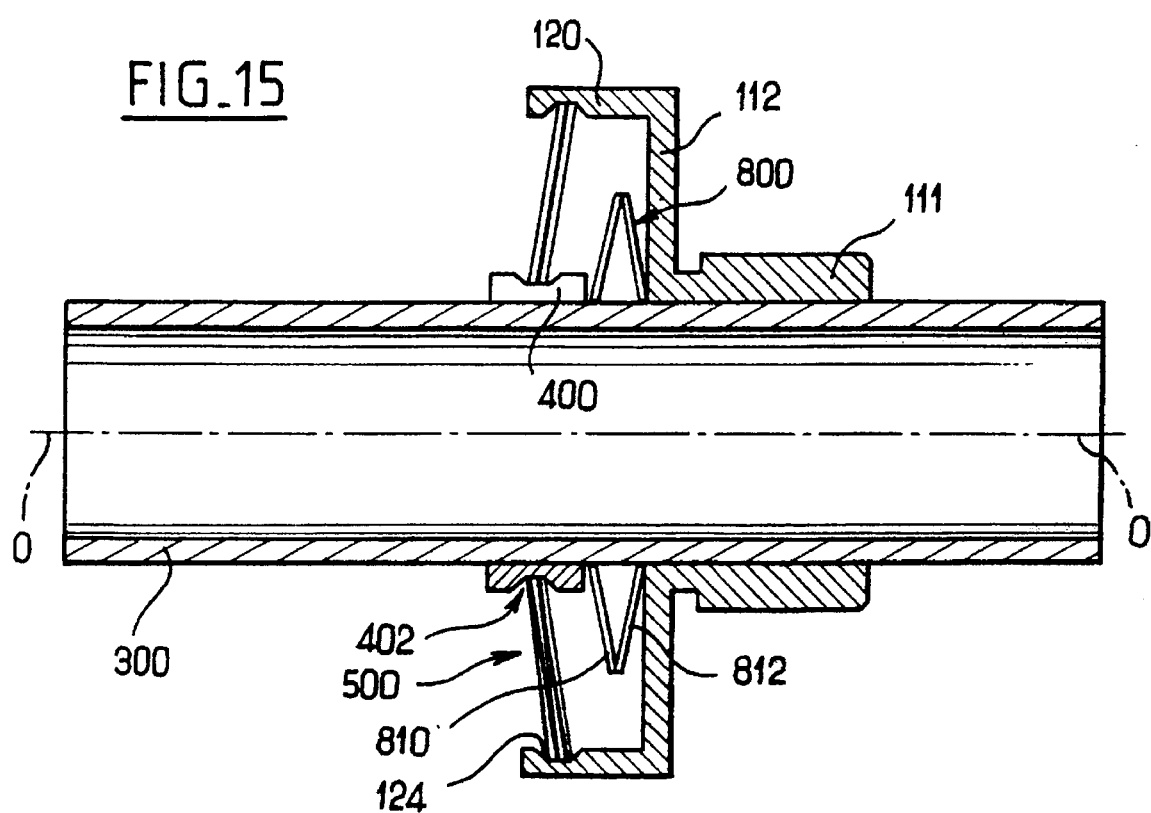
FIG_15
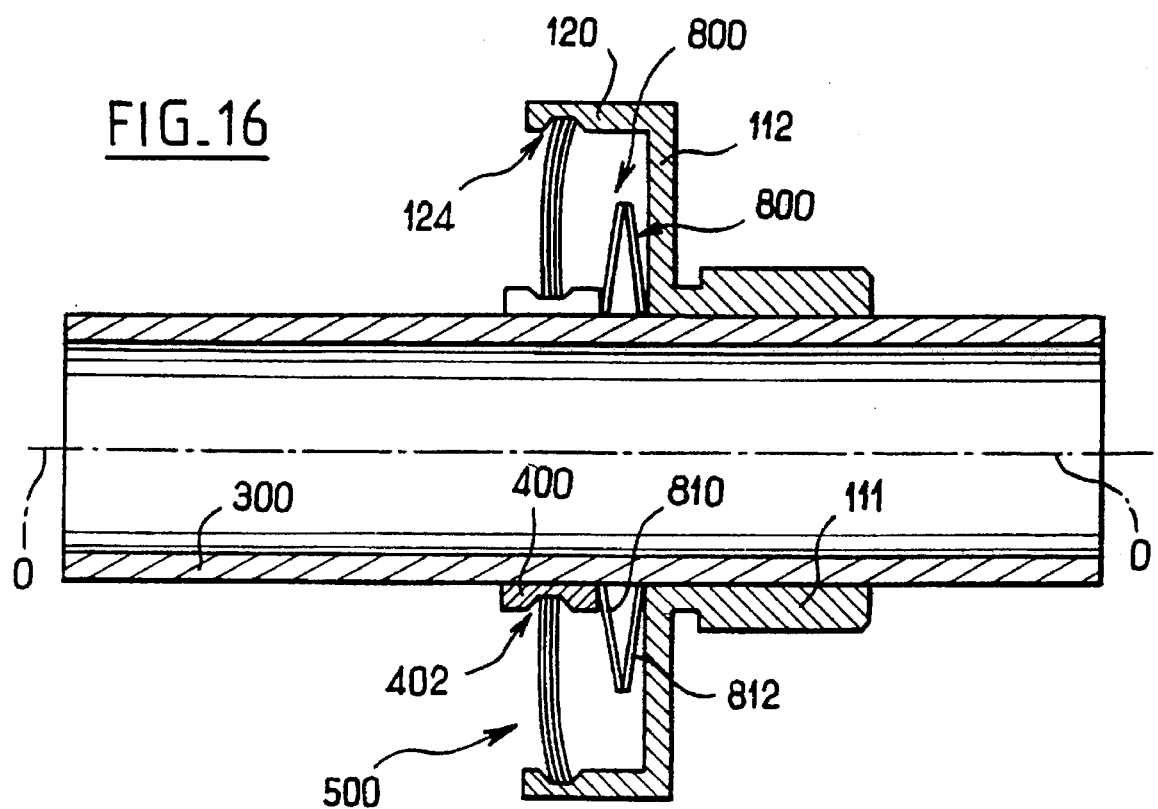
FIG_16

DAMPER DEVICE FOR A MECHANICAL SYSTEM

FIELD OF THE INVENTION

The present invention relates to the field of dampers for mechanical systems in motion.

The present invention relates particularly, but not exclusively, to the field of weapons systems provided with damper devices.

DISCUSSION OF THE PRIOR ART

Numerous damper structures have already been proposed.

For example, dampers have been proposed based on helical springs or the equivalent in the following documents: U.S. Pat. No. 4,895,061, U.S. Pat. No. 2,363,675, U.S. Pat. No. 2,273,878, FR-A-404 988, FR-A-135 971, U.S. Pat. No. 1,480,557, U.S. Pat. No. 1,483,129, U.S. Pat. No. 3,387,538, and U.S. Pat. No. 2,790,357.

Dampers have been proposed based on the flow of particulate substances or the equivalent in the following documents: U.S. Pat. No. 3,105,411, U.S. Pat. No. 4,173,130, U.S. Pat. No. 3,417,660, U.S. Pat. No. 3,521,270.

Proposals have been made for dampers based on hydraulic or pneumatic systems in the following documents: FR-A-2 644 571, FR-A-2 588 370, U.S. Pat. No. 4,388,855, and U.S. Pat. No. 1,845,218.

Proposals have been made for dampers based on honeycombs or the equivalent in the following documents: FR-A-2 653 870, U.S. Pat. No. 4,227,593, U.S. Pat. No. 3,130,819, U.S. Pat. No. 3,552,525, U.S. Pat. No. 3,265,163, U.S. Pat. No. 3,082,846, and U.S. Pat. No. 3,010,040.

Proposals have been made for dampers based on deformable hollow beads in the following documents: FR-A-2 653 870, U.S. Pat. No. 3,923,292, and U.S. Pat. No. 3,637,051.

Proposals have also been made for dampers based on material deformation, cutting, or friction systems in the following documents: FR-A-2 241 726, U.S. Pat. No. 3,501, 997, and U.S. Pat. No. 3,424,448.

Proposals have also been made in document GB-A-907 408 for a damper device comprising two helical springs of different diameters whose respective turns are interspersed between one another.

Furthermore, proposals have been made in document FR-A-2 333 165 for a damper device comprising:

two assemblies suitable for guided relative displacement, one being tied to a reference and the other being movable relative to said reference;

means defining a driving connection between said other assembly and the system to be damped;

a shoe suitable for resting against a first one of the assemblies; and control means formed by sloping links or spring blades interposed between the shoe and the second one of the assemblies in order to rise in the event of a shock on the system to be damped so as to exert a force on the shoe tending to urge said shoe against the first assembly during an active stage of damper device loading corresponding to a first direction of relative displacement between the two assemblies, and to reduce the force exerted by the shoe during a passive stage of damper device loading corresponding to a second direction of relative displacement between the two assemblies.

The device described in that document FR-A-2 333 165 does not give full satisfaction. In particular, it suffers from the risk of the shoe jamming against the first assembly.

SUMMARY OF THE INVENTION

The object of the present invention is to improve existing systems.

A particular object of the present invention is to propose a reversible damper system, i.e. a damper system which does not suffer irreversible damage in use, and which can consequently be reused several times over.

This object is achieved according to the present invention by means of a damper device of the type described in document FR-A-2 333 165, comprising:

two assemblies suitable for guided relative displacement, one being tied to a reference and the other being movable relative to said reference;

means defining a driving connection between said other assembly and the system to be damped;

a shoe suitable for resting against a first one of the assemblies; and control means including resilient means interposed between the shoe and the second one of the assemblies, said control means being adapted to exert a force on the shoe tending to urge said shoe against the first assembly during an active stage of damper device loading corresponding to a first direction of relative displacement between the two assemblies, and to reduce the force exerted by the shoe during a passive stage of damper device loading corresponding to a second direction of relative displacement between the two assemblies, the damper device being characterized by the fact that the control means comprise resilient means that work in buckling.

According to an advantageous further characteristic of the present invention, the resilient means constituting the control means become resiliently loaded while clearance that exists at rest between the shoe and the said second assembly is being taken up, at least in part.

According to another advantageous characteristic of the present invention, provision is also made for a force-limiter between the second assembly and the control means.

According to another advantageous characteristic of the present invention, provision is also made for return means suitable for returning the moving assembly to its starting position during a passive stage that follows the active stage.

Other characteristics, objects, and advantages of the present invention appear on reading the following detailed description of non-limiting examples given with reference to the accompanying drawings.

BRIEF DESCRIPTION OF THE DRAWINGS

FIGS. 15 to 17 show another embodiment of the damper device having three successive stages of operation.

DETAILED DESCRIPTION OF THE EMBODIMENTS OF THE INVENTION

As mentioned above, dampers of the present invention comprise:

two assemblies suitable for guided relative displacement, one being tied to a reference and the other being movable relative to said reference;

means defining a driving connection between said other assembly and the system to be damped;

a shoe suitable for resting against a first one of the assemblies; and resilient control means interposed between the shoe and the second one of the assemblies, said control means being adapted to exert a force on the shoe tending to urge said shoe against the first assembly during an active stage of damper device loading corresponding to a first direction of relative displacement between the two assemblies, and to reduce the force exerted by the shoe during a passive stage of damper device loading corresponding to a second direction of relative displacement between the two assemblies.

Figure 1:
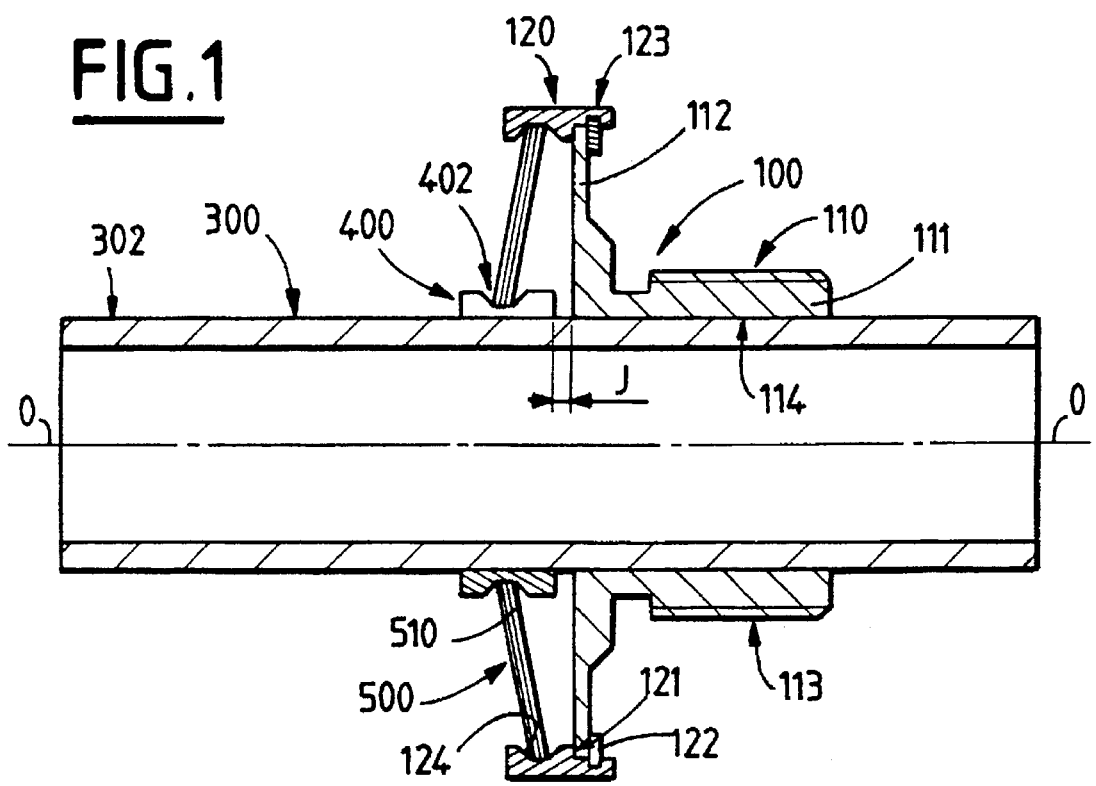
FIG. 1 is a diagrammatic longitudinal axial section view through a damper device constituting a first embodiment of the present invention, shown at rest.
Figure 2:
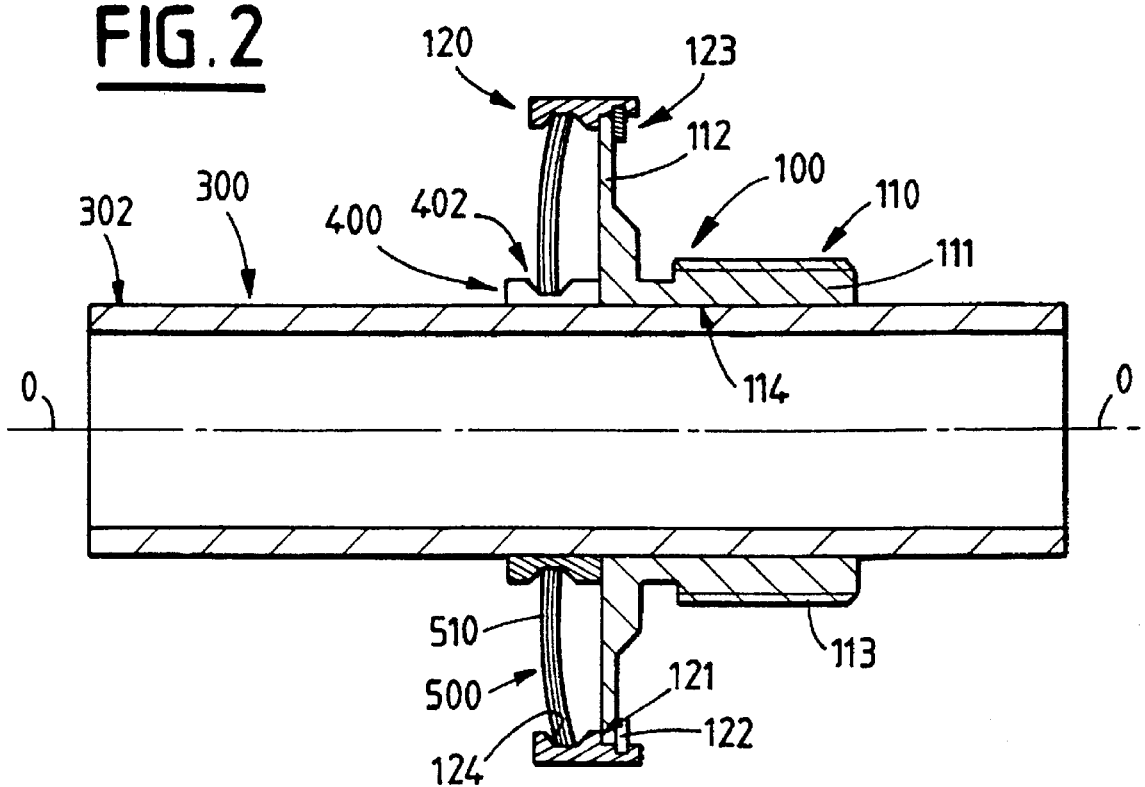
FIG. 2 is a similar view of the same device constituting the first embodiment of the present invention while it is being loaded.

We begin by describing the first embodiment of the damper of the present invention as shown in accompanying FIGS. 1 and 2.

The damper device shown in accompanying FIG. 1 comprises two assemblies 100 and 300 capable of guided relative displacement in translation along an axis O—O, a shoe 400, and control means 500.

Below, it is assumed that the assembly 100 constitutes a stationary abutment part, while the assembly 300 is a moving assembly and is designed to be connected to the system to be damped.

Nevertheless, it should not be considered that this disposition is limiting. Other dispositions are possible, e.g. the inverse disposition, as is also described below.

In other words, it is possible for the part 100 to be a moving part and designed to be connected to the system to be damped, while the assembly 300 is fixed and serves as an abutment part.

Essentially, the assembly 100 is generally in the form of a tubular part centered on the axis O—O.

More precisely, the assembly 100 comprises a part 110 made up of a cylindrical bush 111 centered on the axis O—O, and a flange 112 that is generally plane and in the form of an annulus perpendicular to the axis O—O.

The part 110, and more precisely the bush 111 thereof, may be fixed to a stationary reference by any appropriate means, e.g. using a thread 113 provided on the outside surface of the bush 111.

The assembly 100 also comprises a ring 120 engaged on the outer periphery of the flange 112.

More precisely, the inside surface of the ring 120 is stepped in order to define a seat 121 looking towards one of the axial ends of the ring 120 and serving as an axial thrust bearing surface for the radially outer margin of the flange 112.

Naturally, for this purpose, the radially outermost diameter of the seat 121 needs to be complementary to the outside diameter of the flange 112.

The flange 112, and consequently the part 110, is secured against the ring 120 by means of a spring clip 122 held in a groove 123 formed in the inside surface of the ring 120.

Naturally, in practice, the part 110 and the ring 120 could be united in the form of a single part, e.g. as described with reference to FIGS. 15 to 17.

The ring 120 is also provided on its inside surface with an annular groove 124 whose function is described below.

In the embodiment shown diagrammatically in FIG. 1, the assembly 300 comprises a cylindrical tube centered on the axis O—O. The tube 300 shown in FIG. 1 is of constant outside diameter along its entire length.

The assembly 300 can be guided in translation relative to the assembly 100 along the axis O—O by any suitable known means.

The tube constituting the assembly 300 is preferably guided in translation along the axis O—O by the inside of the bush 111 itself.

To this end, the diameter of the outside surface 302 of the assembly 300 is complementary to the diameter of the inside surface 114 of the bush 111.

Like the assembly 100, the assembly 300 may be made of any suitable material, for example, a material based on metal or on a composite.

The shoe 400 is constituted by a ring centered on the axis O—O and possessing at least one radial slot.

The shoe 400 is engaged on the outside surface 302 of the assembly 300. The shoe 400 may be made of any suitable friction material.

Any pairs of materials presenting a high coefficient of friction can be used in the context of the present invention.

By way of example, the following pairs may be mentioned:

steel and alumina (solid or deposited);

steel and friction composite materials;

carbon on carbon or on steel;

graphite on graphite or on steel;

steel on sintered friction materials;

steel on cast iron;

any other pair of materials that are advantageous for producing friction, in particular ceramics or organic materials.

The shoe 400 advantageously possesses an annular groove 402 in its radially outer surface.

In the embodiment shown in FIG. 1, the control means 500 comprises resilient means constituted by a buckling part 510. More precisely, this buckling assembly is formed by a stack of spring washers that are plane at rest, and that as showed on FIG. 1a possess radial slots a opening out into their peripheries, alternately on the inside and on the outside, to constitute a set of radial beams b which are subject to compression stress. The washers are advantageously made of steel.

When not yet loaded, but after being installed, the washers 510 take up a generally conical shape. Their outer peripheries are received in the groove 124 formed in the ring 120 while their inner peripheries are received in the groove 402 in the shoe. The washers 510 are caused to pass from their initially plane shape to the generally conical shape they have when installed by the diameter of the groove 402 being slightly greater than the inside diameter of the washers 510 in their non-deformed state. The apex of the conical sheet occupied by the washers 510 points towards the direction from which a shock will come so as to cause the shoe to be clamped against the rod in the event of a shock and to cause the shoe to be unclamped from the rod when returning to the initial position (return after shock).

Naturally, where appropriate, it is possible to provide a single spring washer to constitute the buckling part 510.

The system is preferably dismountable so as to enable the spring washers 510 to be changed in the event of washer failure.

The axial positions of the bush 111 and of the shoe 400 must be such as to ensure that, at rest, there exists axial clearance (referenced J in FIG. 1) between the shoe and the part 100.

The system described above operates essentially as follows.

When the assembly 300 connected to the part to be damped moves towards the right, as shown in FIG. 1, i.e. towards the assembly 100, it entrains the shoe 400 by friction, moving it towards the assembly 100 which is held stationary.

This displacement of the shoe 400 causes the beams formed by the part 510 to buckle, as shown in FIG. 2. This buckling of the part 510 tends to clamp the split ring constituting the shoe 400 onto the outside surface 302 of the assembly 300. In other words, the buckling of the part 510 generates a force which the shoe 400 exerts on the assembly 300.

Figure 3:
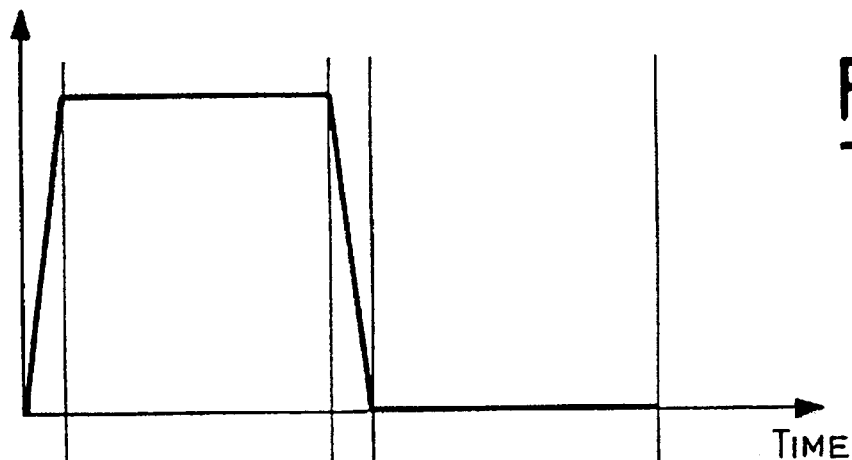
FIG. 3 is a pressure diagram showing contact pressure as a function of time as obtained using such a damper device.

As shown in FIG. 3, this force increases progressively between instants $t_0$ and $t_1$, during a loading stage, until the shoe 400 comes into abutment against the part 100.

Figure 4:
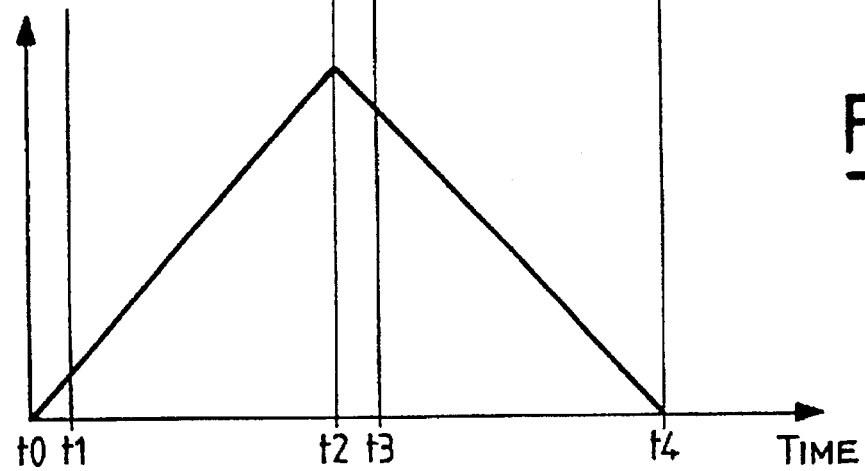
FIG. 4 is a displacement diagram showing the displacement that is obtained as a function of time when using the damper device.
Figure 5:
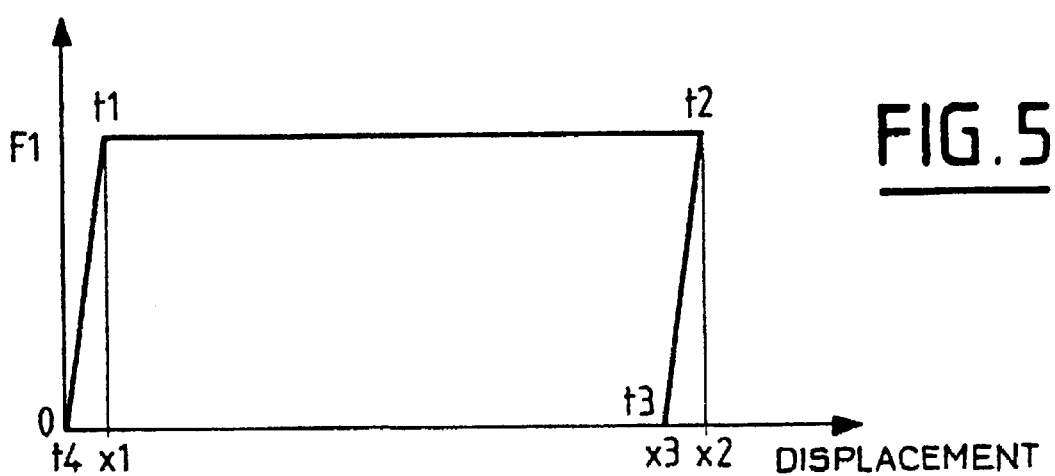
FIG. 5 is a force diagram showing force as a function of displacement as obtained using the damper device.

So long as the assembly 300 is being driven in displacement, which corresponds to a friction stage, i.e. between instants $t_1$ and $t_2$ as shown in FIGS. 3 to 5, the shoe 400 exerts constant contact pressure on the assembly 300.

The shoe 400 thus exerts a friction force on the outside surface 302 of the tube 300 which tends to brake the displacement thereof, thereby damping the force exerted on said assembly 300.

When the assembly 300 comes to rest, i.e. between instants $t_2$ to $t_3$ as shown in FIGS. 3 to 5, which corresponds to an unloading stage, the contact pressure of the shoe 400 on the assembly 300 deceases progressively.

Naturally, it will be understood that the above-described damper system is reversible, i.e. during displacement of the assembly 300 to the left, as shown in FIGS. 1 and 2, the various parts described above return to their original positions, as shown in FIG. 1.

This return or resetting stage is illustrated between instants $t_3$ and $t_4$ in FIGS. 4 and 5.

This return or resetting stage can be obtained by action that is manual or automatic, e.g. by means of a return spring acting on the assembly 300.

During the loading and unloading stages energy is being both dissipated and stored elastically.

As mentioned above, FIG. 3 is a diagram of contact pressure as a function of time, FIG. 4 is a diagram of displacement as a function of time, and FIG. 5 is a diagram of force as a function of displacement.

As shown in FIG. 2, the Washers 510 buckle so that their concave sides face towards the assembly 100.

Nevertheless, it would also be possible for buckling to be designed to take place in the opposition direction, i.e. so that their convex sides face towards the assembly 100.

Abutment fingers could optionally be provided on the surface of the flange 112 adjacent to the washers 510 in order to impose reverse direction buckling on the washers 510 (convex side facing towards the assembly 100).

It may be observed that the washers 510 act simultaneously as a force-limiter and as a force amplifier that transforms the axial force due to the displacement of the assembly 300 into a radial force on the shoe 400.

Tests performed by the Applicant have shown that this damper system can be used over a very wide range of speeds, which may extend to speeds greater than 100 meters per second (m/s).

The effectiveness of the damper depends little on the speed with which it is loaded since coefficient of friction changes little with slip speed. This also makes the friction damper particularly effective for motions that present large variations in speed.

Furthermore, this damper system makes it possible to damp forces lying in a very wide range, e.g. about 10N to a few hundred kN, depending on the means 500 used.

The shape of the damping diagram can also be varied in numerous ways, e.g. by giving the outside surface 302 of the assembly 300 and/or the inside surface 114 of the bush 110, and/or of the shoe 400 a section that varies, thereby modulating the friction force that is generated, or else the surface state of the assembly may be controlled, e.g. by providing a coefficient of friction that varies along the length of the friction surfaces involved.

The above-described damper system can be used over a wide range of temperatures, typically from cryogenic temperatures to several hundreds of °C.

Finally, the above-described damper system makes relatively large amplitude displacements possible between the assemblies 100 and 300, typically of the order of a few millimeters to a few meters.

In a variant, the shoe 400, the control means 500, and the assembly 100 may be placed inside the tube 300, as described below, rather than outside it.

The second embodiment of the present invention is described below with reference to accompanying FIG. 6.

Figure 6:
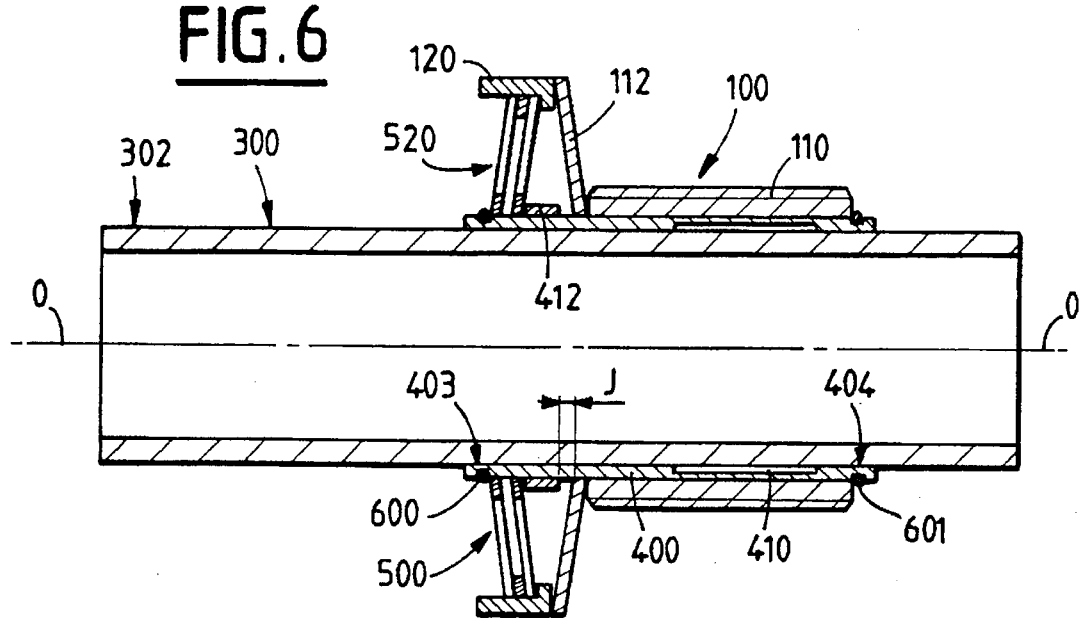
FIG. 6 is a diagrammatic longitudinal view showing a damper constituting a second embodiment of the present invention, while at rest.

In FIG. 6, there can be seen the assemblies 100 and 300 which are liable to move in relative translation, a shoe 400, and a control means 500.

However, in the embodiment shown in FIG. 6, the shoe 400 is in the form of a long tube whose outside surface receives the assembly 100 and the control means 500.

More precisely, the tube constituting the shoe 400 possesses two grooves 403 and 404 in the vicinity of respective axial ends thereof, which grooves receive respective spring clips 600 and 601 that serve to provide axial abutments for the control means 500 and for the bush 110.

Furthermore, in the embodiment shown in FIG. 6, the bush 110, the flange 112, and the ring 120 are constituted by separate parts that are axially stacked together.

In order to limit and confine the active friction area of the shoe 400, the component tube thereof is preferably provided with an annular internal cavity 410.

A ring 412 is engaged on the shoe 400 and rests axially against the radially inner periphery of the means 500 in such a manner as to ensure that the clearance for allowable displacement between the shoe 400 and the assembly 100 is defined by the axial clearance J that exists at rest between said ring 412 and the base of the flange 112.

Yet more precisely, in the embodiment shown in FIG. 6, the control means 500 comprises at least one star-shaped spring washer 520, and preferably a stack of such star-shaped spring washers 520.

In FIG. 6, three such star-shaped spring washers 520 are shown diagrammatically in an axial stack and interposed between the outside surface of the shoe 400 and the inside surface of the ring 120.

These star-shaped washers 520 are made up of flat conical rings (Belleville type conical washers) having radial slots that open to their inner and outer peripheries in alternation.

These washers 520 are typically made of quench-hardened special spring steel.

When an axial force is exerted on the inside periphery or on the outside periphery of such washers 520, while the other, outside or inside periphery is resting against an axial abutment, the star-shaped washers 520 are subjected to an increase in outside diameter and a decrease in inside diameter.

The axial forces thus exerted are consequently transformed into radial forces that are five to six times greater and that act uniformly on the shoe 400.

Still more precisely, these star-shaped washers 520 typically constitute a cone having a half-angle at the apex of about 80°, e.g. of 81°.

Such washers 520 form a mechanical force multiplexer in which the multiplication factor k is equal to 1/tan(90°-the half-angle at the apex of the washers).

For washers 520 having a half-angle at the apex of the cone equal to 180°, the force multiplication factor is given by k=1/tan 9°, k=6.31.

The flange 112 shown in FIG. 6 and interposed between the ring 120 and the bush 110 may be formed by a rigid part.

Nevertheless, in a variant, this flange 112 may be formed by a force-limiter, e.g. constituted by a Belleville type washer.

Naturally, although not shown in FIG. 6, the assembly 13 may be associated with automatic return means, such as a return spring, for example.

Figure 7:
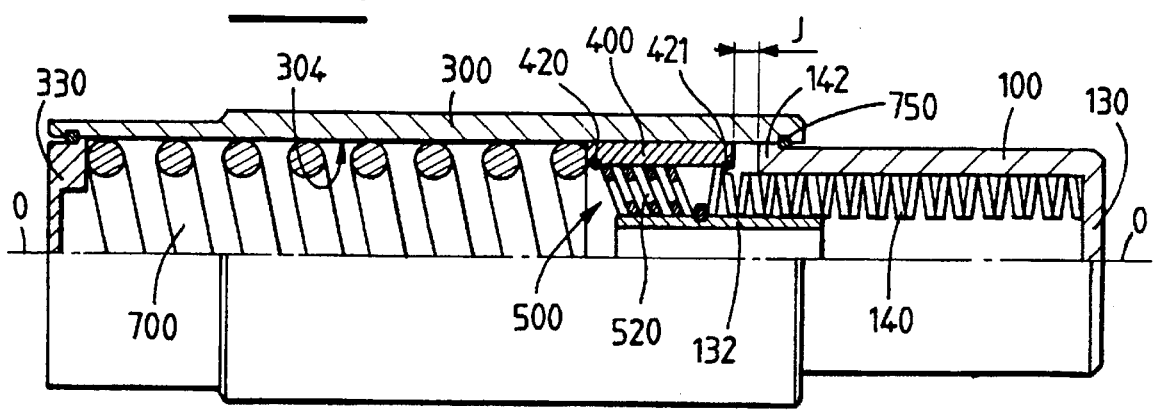
FIGS. 7 to 14 are similar diagrammatic longitudinal section views of dampers constituting other embodiments of the present invention.

FIG. 7 shows another variant embodiment of a damper device of the present invention in which there can be seen the two assemblies 100 and 300 constituted by tubular elements capable of moving in relative translation along a central axis O—O.

Each of these tubular elements 100 and 300 is provided with a partition 130 or 330 at an axial end, said partition being in the form of a disk extending transversely to the axis O—O.

More precisely, the assembly 100 is placed inside the assembly 300 so that the two chamber respectively defined by the assemblies 100 and 300 are placed looking into each other.

Similarly, the shoe 400 and the associated control means 500 are placed inside the assembly 300.

More precisely, in this example, the split ring 400 rests against the inside surface 304 of the assembly 300.

The control means 500 are interposed between the inside surface of the split ring 400 and the outside surface of a drum 132 connected to the assembly 100.

In the present example, the control means 500 are made up of a stack of star washers 520 of the type described above with reference to FIG. 6.

The washers 500 are confined on the inside surface of the ring 400 by means of two spring clips 420 and 421 engaged in grooves formed in the inside surface of the ring 400.

In addition, in the embodiment shown in FIG. 7, the control means 500 formed by the spring washers 520 axially against a stack of Belleville washers 140 acting as a force-limiter and housed in the assembly 100 on the outside of the drum 132.

It may be observed that, where appropriate, the force-limiter formed of Belleville washers 140 could be omitted.

Under such circumstances, the spring washers 520 would bear axially against a rigid piston secured to the assembly 100.

FIG. 7 shows a return spring 700 interposed between the shoe 400 and the assembly 300, and more particularly the transverse partition 330 thereof.

In a variant, the return spring 700 could be interposed between the partition 330 of the assembly 300 and the assembly 100.

It should be observed that here again, at rest, axial clearance J is provided between the shoe 400 and the assembly 100.

During relative displacement in translation along the axis O—O between the two assemblies 100 and 300, in the loading direction of the damper device, the shoe 400 is driven towards the assembly 100 by friction against the inside surface of the assembly 300.

This displacement tends to reduce the clearance J formed between the shoe 400 and the assembly 100, thereby loading the spring washers 520 to increase the friction force between the shoe 400 and the inside surface of the assembly 300.

When relative displacement between the assemblies 100 and 300 is in the opposite direction under drive from the return spring 700, the spring washers 520 are unloaded and consequently the friction force between the shoe 400 and the inside surface of the assembly 300 is reduced.

It is preferable to provide means suitable for preventing the assemblies 100 and 300 becoming separated. Such retaining means may be implemented in numerous different ways.

In the example shown in FIG. 7, they are constituted by a spring clip 750 engaged in a groove formed in the inside surface of the assembly 300 near the outline of the opening therein, and serving to engage an annular rib 142 provided on the outer periphery of the assembly 100, around the outline of the opening therein.

Figure 8:
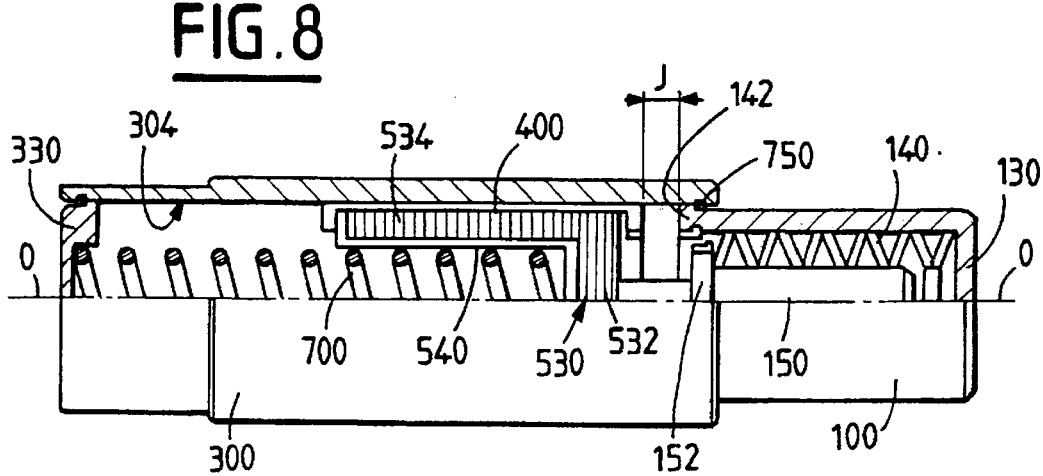

FIG. 8 shows a damper device comprising two assemblies 100 and 300 capable of moving in relative translation along a central axis O—O, each of the assemblies 100 and 300 being provided with a transverse partition 130 or 330.

Accompanying FIG. 8 also shows a shoe 400 resting against the inside surface 304 of the assembly 300, and a return spring 700.

However, in the embodiment shown in FIG. 8, the control means 500 essentially comprise a deformable elastomer body 530 interposed between the assembly 100 and the shoe 400.

This elastomer body 530 is preferably a body of revolution about the axis O—O and has a U-shaped right cross-section.

The web 532 of the body 530 is in the form of a disk-shaped wall extending transversely to the axis O—O, and facing the assembly 100.

The flanges 534 of this U-shaped right cross-section form a circularly cylindrical skirt about the axis O—O and located inside the shoe 400.

The elastomer block 530 is preferably placed outside a deformable tank 540. This tank placed inside the body 530 is also generally in the form of a body of revolution having a U-shaped right cross-section.

More precisely still, the web 532 of the elastomer block 530 rests against a piston 150 housed inside the element 100. The piston 150 is constituted by a rigid element provided with an annular collar 152.

In a manner comparable to the embodiment shown in FIG. 7, a force-limiter constituted by an axial stack of a plurality of Belleville type spring washers 140 is interposed between the far wall 130 of the assembly 100 and said collar 152.

Nevertheless, in a variant, the Belleville type washers 140 forming a force-limiter could be omitted, in which case the rigid piston would rest directly against the wall 130 or it could be fixed thereto.

The skirt 534 of the elastomer block 530 rests against the inside surface of the shoe 400.

The elastomer block 530 is caused to press against the shoe 400 under drive from the piston 150 when the assemblies 100 and 300 move towards each other.

The resulting mechanical force multiplication is associated with the area ratio between the surface of the web 532 resting against the piston 150 and the surface of the skirt 534 resting against the shoe 400.

Figure 9:
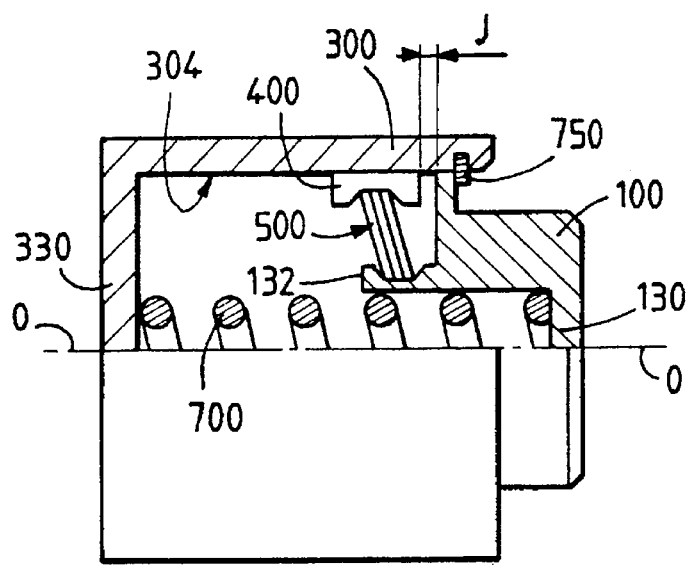

FIG. 9 shows a variant embodiment that differs from the embodiment shown in FIG. 7 essentially by omission of the force-limiter 140.

FIG. 9 thus shows two assemblies 100 and 300 suitable for moving in relative translation along the central axis O—O, a shoe 400 resting against the inside surface 304 of the assembly 300, control means 500 interposed between a skirt 132 associated with the assembly 100 and the inside surface of the shoe 400, and more precisely a groove formed in the inside periphery thereof, and a return spring 700 interposed between the transverse wall 330 of the assembly 300 and the transverse wall 130 of the assembly 100.

The control means 500 shown in FIG. 9 may be formed by washers suitable for buckling, as described above.

In the embodiment shown in FIG. 9, it can be seen that the return means 700 are formed by a helical spring.

Figure 10:
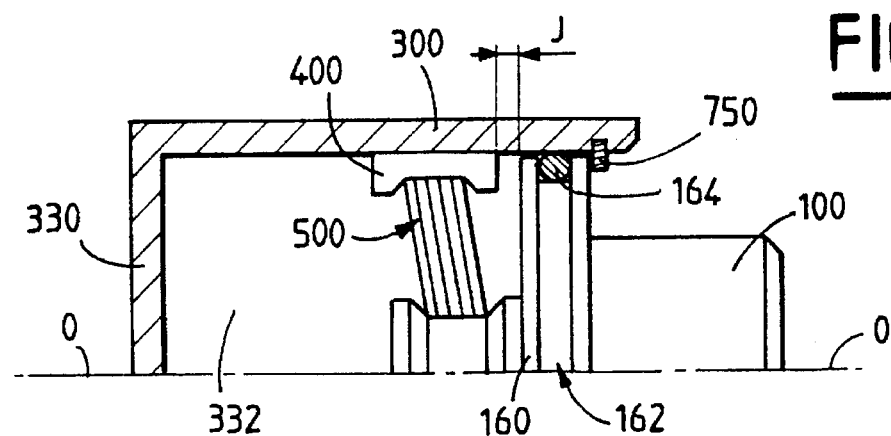

The embodiment shown in FIG. 10 differs from that shown in FIG. 9 in that the return springs 700 are no longer formed by a helical spring interposed between the two assemblies 100 and 300, but by compressing a volume of air.

More precisely, an the embodiment shown in FIG. 10, the assembly 300 and its transverse partition 330 define a blind internal chamber 332 whose opening is closed by the assembly 100 which forms a piston.

To this end, the outside surface of the assembly 100 has a collar 160 which is provided with an annular groove 162 which receives an O-ring 164.

It will be understood that the O-ring 164 provides sealing between the two assemblies 100 and 300, such that the volume of air contained in the chamber 332 is compressed when the two assemblies move towards each other in relative translation along the axis O—O, and the air compressed in this way urges the two assemblies 100 and 300 back towards their starting position as soon as the force exerted on the moving assembly is removed.

Figure 11:
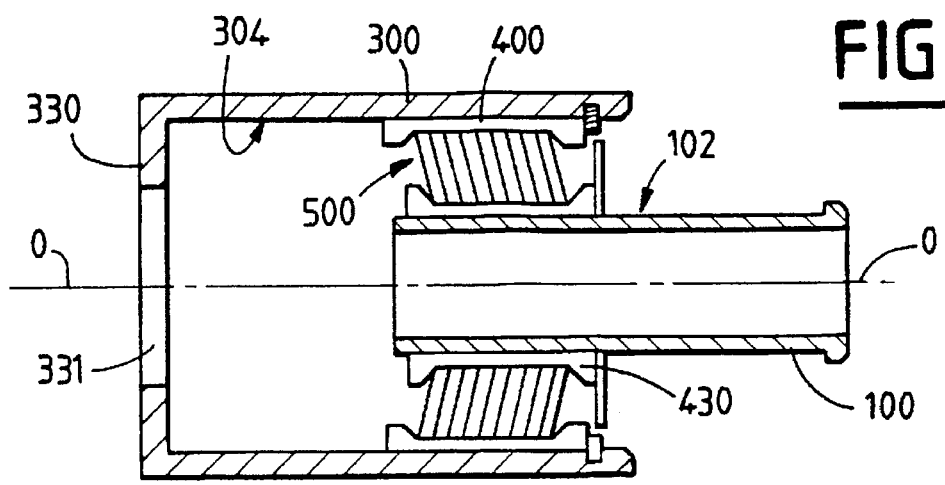

Accompanying FIG. 11 shows a variant embodiment of the telescopic structure that makes it possible to increase the relative stroke between the two assemblies 100 and 300.

In FIG. 11, there can be seen two assemblies 100 and 300 formed by tubular structures suitable for moving in relative translation along the central axis O—O.

However, an this embodiment, two annular and concentric shoes 400 and 430 are provided, one resting against the inside surface 304 of the assembly 300 while the other rests against the outside surface 102 of the assembly 100.

The control means 500 are interposed between the two shoes 400 and 430. These control means 500 preferably comprise resilient means such as star-shaped washers, or washers capable of buckling, as described above.

The transverse partition 330 of the assembly 300 needs to be provided with a passage 331 through which the central assembly 100 can slide.

It is generally difficult to obtain exactly equal friction forces between each of the shoes 400, 430, and the respective assemblies 300, 100, given that coefficients of friction are generally not accurately identical, and particularly because of the different areas involved.

The embodiment shown in FIG. 11 thus leads to a response of force as a function of displacement in the form of two successive levels of different respective constant amplitudes: a first level corresponding to the smaller friction force followed by a second force level that is greater.

Figure 12:
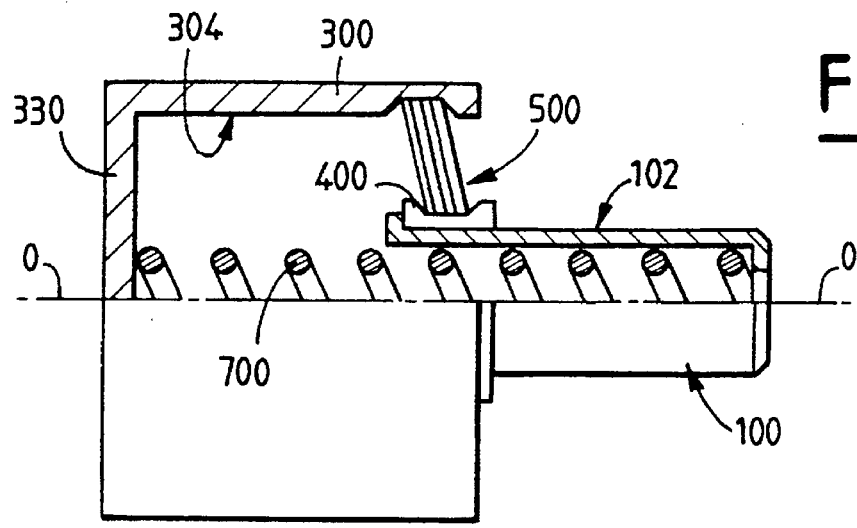

The embodiment shown in FIG. 12 differs from the embodiment shown in FIG. 9 by the shoe 400 resting on the outside surface 102 of the central element 100 instead of on the inside surface 304 of the assembly 300.

Consequently, in this case, the control means 500 which are preferably constituted by star-shaped spring washers or washers suitable for buckling are interposed between the assembly 300 and the shoe 400 rather than between the assembly 100 and the shoe 400.

Figure 13:
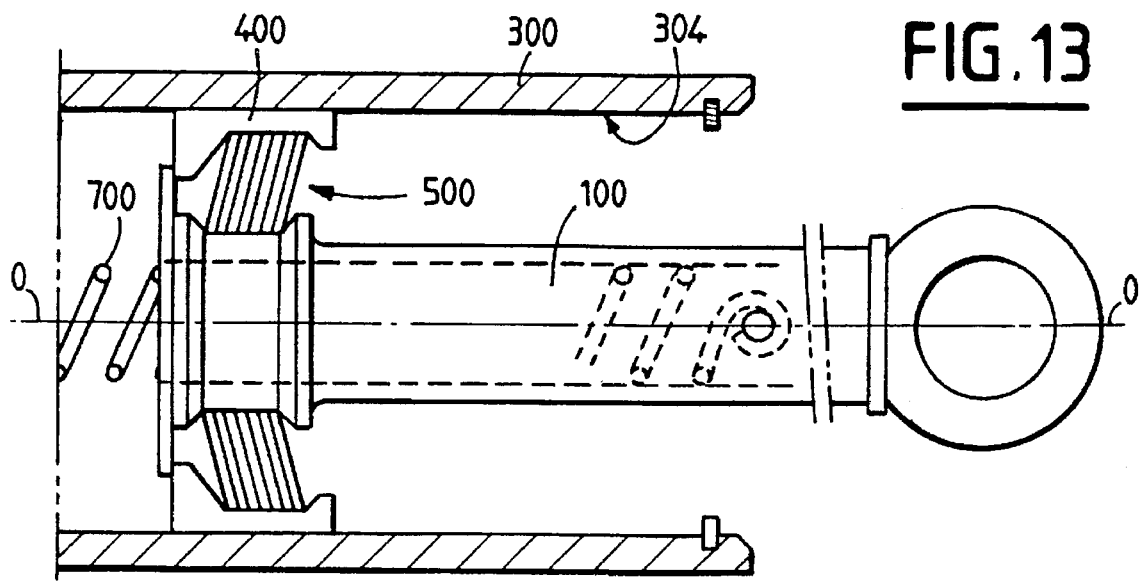

The embodiment shown in FIG. 13 corresponds substantially to the embodiment shown in FIG. 9.

In FIG. 13, there can be seen two tubular assemblies 100 and 300 suitable for moving in relative translation along a central axis O—O, a shoe 400 resting on the inside surface 304 of the assembly 300, and control means 500 interposed between the assembly 100 and the shoe 400, which control means 500 are advantageously constituted by spring washers such as star-shaped washers or indeed washers suitable for buckling.

Nevertheless, the embodiment shown in FIG. 13 illustrates the possibility of operating in traction rather than in compression, both with respect to the force exerted on one of the assemblies, e.g. on the assembly 100 in the particular embodiment shown in FIG. 13, and with respect to the return spring 700.

Naturally, working in traction as shown diagrammatically in FIG. 13 could also be applied to a variant embodiment in which the shoe 400 rests on the assembly 100 instead of the assembly 300, or to a variant of the type shown in FIG. 11 that includes two shoes 400 and 430.

Figure 14:
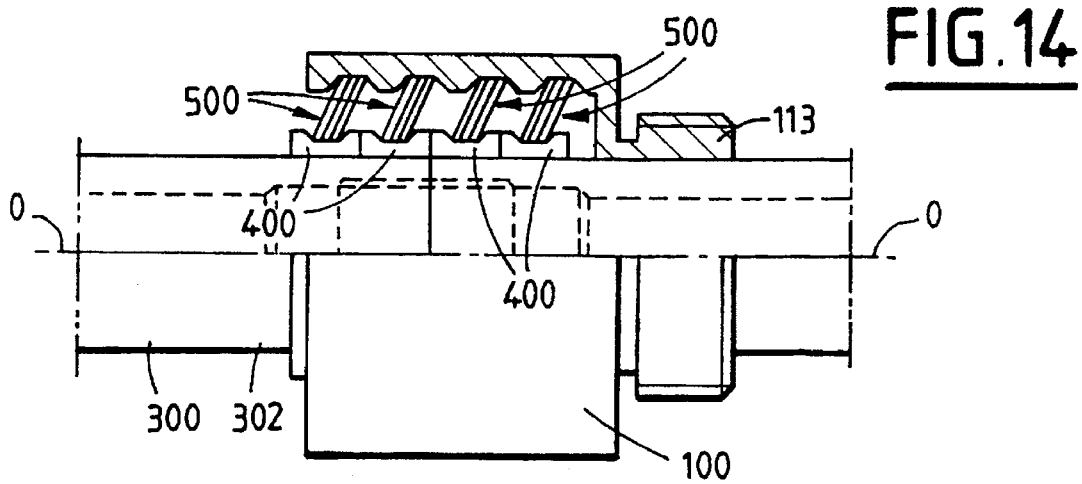

The embodiment shown in FIG. 14 has a plurality of shoes 400 stacked axially.

More precisely, in the particular embodiment shown in FIG. 14, four shoes 400 are provided which are juxtaposed axially.

In a manner comparable to FIG. 1, there are also two assemblies 100 and 300 suitable for moving in relative translation along the central axis O—O.

Furthermore, each shoe 400 is associated with respective control means preferably constituted by spring washers, such as star-shaped washers, or indeed washers suitable for buckling, as described above.

Still more precisely, these control means 500 in the embodiment shown in FIG. 14 are interposed between each of the shoes 400 and a respective groove formed in the inside surface of the assembly 100.

The advantage of using a plurality of shoes 400 juxtaposed in this way along the axis O—O is to obtain averaging of the resulting friction force.

This disposition turns out to be particularly advantageous in devices that comprise an assembly such as the assembly 300 in FIG. 14 which is constituted by an axial juxtaposition of different parts.

In addition, the use of different shoes 400 makes it possible to facilitate passing over the discontinuity between said parts while nevertheless guaranteeing a damping force that is practically constant.

Figure 17:
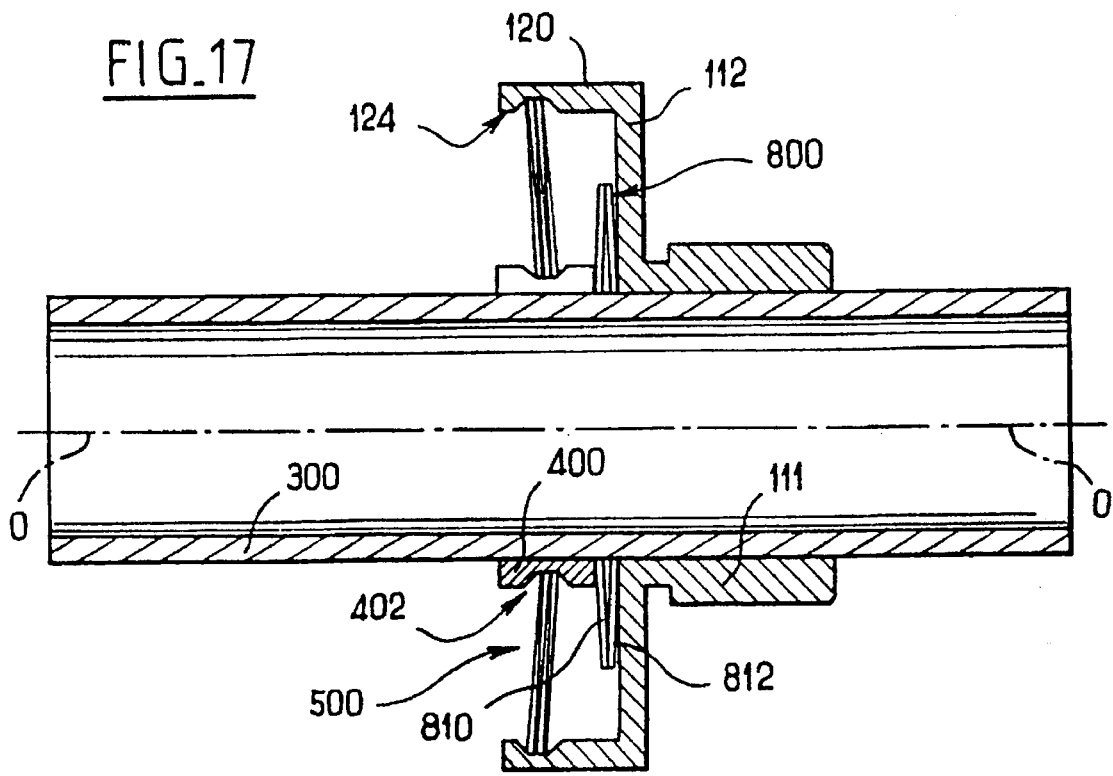

The embodiment shown in FIGS. 15 to 17 is described below.

In a manner comparable to FIG. 1, there can be seen in FIG. 15:

a first assembly 100 constituted by a body comprising a cylindrical bush 111, a flange 112, and a ring 120;

a second assembly 300 formed by a rod that is guided in translation inside the bush 110 along the axis O—O;

a shoe 400 formed by a split friction ring placed on the rod 300 and suitable for rubbing thereagainst; and at least one thin split washer 500, and preferably a plurality of such washers 500 in a stack, having an outside periphery received in a groove 124 of the ring 120 and an inside periphery of the same washers 500 received in a groove 402 of the friction ring, such that the washers 500 urge the ring 400 against the rod 300. These washers 500 are the same as those described above with reference to FIG. 1. They constitute a multiplicity of radial beams suitable for buckling.

Nevertheless, in FIG. 15, it should be observed that resilient abutment means 800 are also provided between the friction ring 400 and the flange 112 of the first assembly 100.

This resilient abutment 800 can be implemented in numerous ways. Advantageously, it is constituted by two Belleville type washers 810 and 812 mounted opposite ways round, having their concave sides facing each other and bearing against each other via their outer peripheries.

At rest, a small amount of axial clearance J is still provided between the resilient abutment 800 and the friction ring 400 or the flange 112.

The axial abutment 800 is preferably adapted to generate a reaction force that is linear as a function of its axial strain or deformation.

The device shown in FIG. 15 operates as follows.

When the device is at rest, the washers 500 are frustoconical in shape. Consequently, the corresponding beams for buckling are rectilinear, in a "stand-by" position. The resilient abutment 800 is not loaded.

The friction ring 400 is pressed against the rod 300 by the resilience of the washers 500.

In the event of a shock, the stiffness of the mechanism enables the friction ring 400 to be driven together with the rod 300. The washers 500 are then loaded so that they buckle as shown in FIG. 16.

The axial clearance J and the deformation allowed by the axial abutment 800 are adapted to enable the washers 500 to deform towards their second stable equilibrium state, i.e. to cause the concave side of the washers to flip over (in the displacement direction of the rod 300 at rest—see FIG. 15—and in the opposite direction after loading—see FIG. 17).

The relative displacement of the ring 400 relative to the body 100 comes to an end when, after being subjected to buckling deformation, the beams 500 take up a rectilinear position in which they are loaded by the resilient abutment 800, as shown in FIG. 17.

Figure 18:
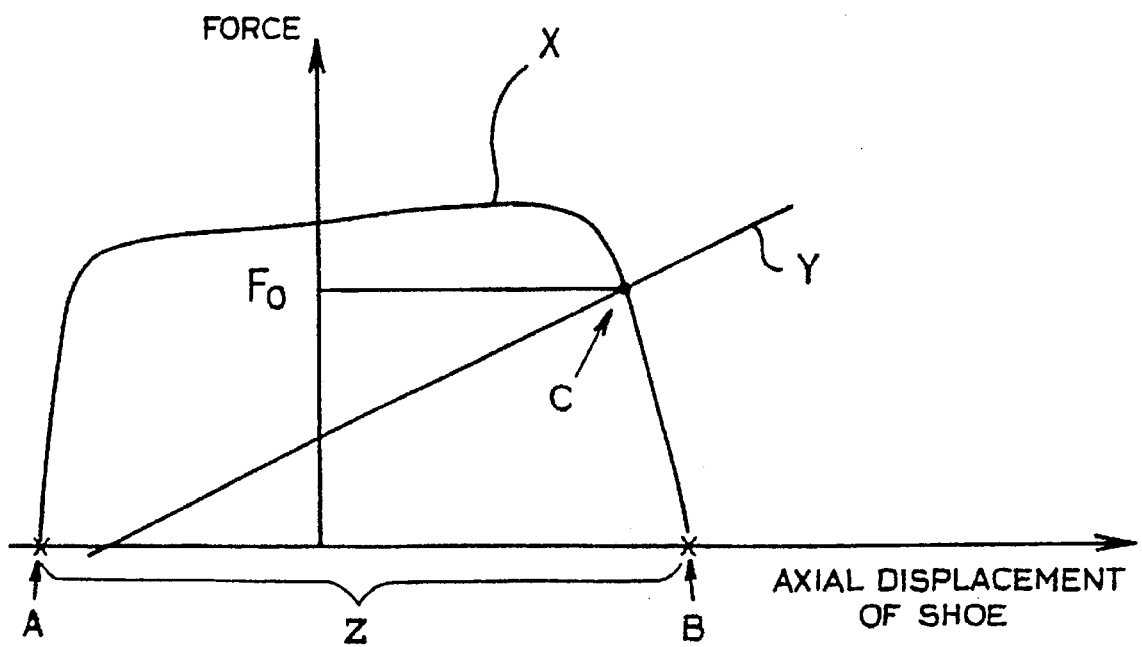
FIG. 18 is a diagram showing how the above embodiment of FIGS. 15 to 17 operates.

As can be seen in FIG. 18, the system is adapted so that the curve of return force generated by the resilient abutment 800 intersects the curve of friction between the shoe and the rod where said curve has a falling edge.

During relative displacement in the active loading direction, the friction force due to the shoe 400 opposes the action of the resilient abutment 800.

In the event of too much friction force, the collapse of the resilient abutment 800 allows the washers 500 to relax.

Slip thus takes place under a friction force that is properly controlled by the resilient abutment 800.

When the mechanism is no longer loaded, the geometry of the washers 500 and of the resilient abutment 800, and also the clearance J, cause the washers 500 to return to their first stable equilibrium state, as shown in FIG. 15.

To sum up, at the beginning of a shock, the deformation for passing from the stand-by state (FIG. 15) to the controlled friction state (FIG. 17) takes place by passing through forced buckling going from an initial equilibrium position for the washers 500 tending to stiffen the system towards a second equilibrium position for the washers 500 tending to release the washers, with such release then being under the control of the resilient abutment 800.

It can be shown that the tangential effect of friction during relative sliding between the rod 300 and the shoe 400 can be written:

$$T = F_0 f / (f + \tan\alpha)$$

where:

$f$ = the coefficient of friction between the shoe 400 and the rod 300;

$\alpha$ = the angle of inclination of the buckling beams 500 relative to the normal to the axis O—O, in the position of FIG. 17; and $F_0$ = the opposing axial force produced by the resilient abutment 800.

It is also easy to show that a variation $df/f$ in the coefficient of friction between the pair of materials gives rise to a variation $dT/T$ in the response of the damper, where:

$$dT/T = [\tan\alpha \times df] / [(f + \tan\alpha) \times f]$$

The embodiment shown in FIGS. 15 to 17 offers the following advantages, in particular:

it makes it possible to limit very significantly fluctuation in the force response of friction shock absorbers;

it makes it possible to set the mechanism by controlling the response of the resilient abutment $F_0$; and it makes it possible to alter the response of the friction damper without altering the number of washers 500 in the device.

In a variant, the Belleville washers 800 may be replaced by any equivalent means.

Furthermore, the damper system as described above can be used in numerous applications.

In particular, the damper system can be used in a weapons system, but that application should nevertheless not be considered as being limiting.

In that particular case, the stationary reference may be constituted by a gun stock or hand grip for firing from the shoulder, or indeed a gun mount, in which case the moving element is constituted by a gun barrel that is guided to slide relative to the stationary reference.

In the various embodiments descried above, the two assemblies 100 and 300 are suitable for moving in relative translation, and the force exerted on the moving one of the assemblies may be a compression type force or a traction type force.

Naturally, the person skilled in the art will easily be able to adapt the general structure of the damper of the present invention to damper systems comprising two assemblies capable of moving in relative rotation.

Where applicable, prestressing means may be provided for taking up at least a part of the clearance J that exists between the shoe 400 and the second assembly, thereby preloading the resilient means acting on the shoe 400 before any relative displacement takes place between the two assemblies. This ensures that when the damper is in use, there is no transient stage during which the moving assembly has time to pick up speed.

The Applicant has also observed that if, in use, the friction surfaces become dirtied with fatty substances, then the characteristics of the system can change considerably.

To avoid this drawback, it is proposed to apply light prelubrication to the friction surfaces in controlled manner and to adjust the system while it is in this state, thereby ensuring that any subsequent dirtying of said surfaces does not significantly spoil the response of the damper system.

In FIG. 18:

curve X represents the friction force applied by the shoe on the rod (when loaded by the washers 500);

curve Y represents the resistive force of the resilient abutment 800;

point A represents the first equilibrium state of the washers 500;

point B represents the second equilibrium state of the washers 500;

point C represents the equilibrium point of the damper system; and the excursion Z represents the buckling deformation state of the washers 500.

I claim:

1. A damper device of the type comprising:
a first assembly (100) and a second assembly (300) guided in relative displacement, said first assembly being tied to a reference and said second assembly being movable relative to said reference;
means (113) defining a driving connection between said second assembly and a system to be damped;
a shoe (400) resting against said first assembly; and
control means (500) including buckling resilient means (510) interposed between the shoe (400) and said second assembly, said control means being adapted to exert a force on the shoe (400) tending to urge said shoe against said first assembly during an active stage of damper device loading corresponding to a first direction of relative displacement between said first and second assemblies (100, 300), and to reduce the force exerted by the shoe (400) during a passive stage of damper device loading corresponding to a second direction of relative displacement between said first and second assemblies (100, 300),
wherein the resilient means (510) are composed of beams which are rectilinear in a standby position, and which rest by the ends respectively on the shoe and on said second assembly.

2. A device according to claim 1, characterized by the fact that said resilient means take up at least a portion of clearance (J) that exists between the shoe (400) and the second assembly.

3. A device according to claim 1, characterized by the fact that said device further includes a force-limiter (140).

4. A device according to claim 3, characterized by the fact that the force-limiter comprises resilient members (140).

5. A device according to claim 3, characterized by the fact that the force-limiter (140) comprises at least one Belleville type spring washer.

6. A device according to claim 1, characterized by the fact the resilient means of the control means (500) comprise at least one spring washer.

7. A device according to claim 1, characterized by the fact that the resilient means of the control means (500) comprise at least one washer and provided with radial slots that open to the periphery of said washer, alternately on the inside and on the outside.

8. A device according to claim 1, characterized by the fact that the resilient means of the control means (500) comprise a plurality of stacked spring washers.

9. A device according to claim 1, characterized by the fact that the resilient means of the control means (500) comprise a piece of elastomer (530).

10. A device according to claim 1, characterized by the fact that said second assembly is guided for relative translation in regard to said first assembly.

11. A device according to claim 1, characterized by the fact that the shoe (400) and the first assembly (100, 300) are cylindrical pieces having friction surfaces, said friction surfaces having constant diameter along the lengths of said pieces.

12. A device according to claim 1, characterized by the fact that the shoe (400) and the first assembly (100, 300) have friction surfaces, wherein one of said friction surfaces is generally cylindrical while the other friction surface has a diameter which varies along its length.

13. A device according to claim 1, characterized by the fact that the shoe (400) is formed by a split ring.

14. A device according to claim 1, characterized by the fact that an outer surface of the shoe (400) supports one of the assemblies (100).

15. A device according to claim 14, characterized by the fact that said first assembly (100) is held on the outer surface of the shoe (400) by two spring clips (600, 601).

16. A device according to claim 14, characterized by the fact that the shoe (400) is formed by a cylindrical element having an internal annular cavity (410).

17. A device according to claim 1, characterized by the fact that the shoe (400) is placed on an outside surface of said first assembly.

18. A device according to claim 1, characterized by the fact that the shoe (400) is placed on an inside surface of one of the assemblies (100, 300).

19. A device according to claim 1, further comprising an additional shoe (430), one of the two shoes (400, 430) bearing against an inside surface of one of the assemblies (300) while the other shoe bears against an outside surface of the other assembly (100), and that the control means (500) are interposed between the two shoes (400, 430), and exerting force on the shoes (400, 430) tending to urge said shoes toward said assemblies during an active stage of damper device loading corresponding to a first direction of relative displacement between said assemblies and to reduce force exerted on said shoes during a passive stage of damper device loading corresponding to a second direction of relative displacement between said assemblies.

20. A device according to claim 1, characterized by the fact that said second assembly is guided for relative translation in regard of said first assembly and that a plurality of additional shoes (400) are resting against and juxtaposed axially along the direction of translation of said second assembly with respective buckling resilient means (500) between the additional shoes resting against the second assembly and the shoe resting against said first assembly.

21. A device according to claim 1, characterized by the fact that return means (700) are provided urging the two assemblies (100, 300) towards a rest position.

22. A device according to claim 21, characterized by the fact that the return means (700) are formed by a return spring.

23. A device according to claim 22, characterized by the fact that the return spring (700) operates in compression.

24. A device according to claim 22, characterized by the fact that the return spring (700) operates in traction.

25. A device according to claim 21, characterized by the fact that the return means (700) are formed by compressing a volume of air.

26. A device according to claim 25, characterized by the fact that the two assemblies (100, 300) define an internal airtight chamber (332).

27. A device according to claim 1, characterized by the fact that said device includes prestress means which load the resilient means (510) acting on the shoe (400) by taking up at least a part of a clearance (J) that exists between the shoe (400) and the second assembly, prior to any relative displacement between the two assemblies (100, 300).

28. A device according to claim 1, characterized by the fact that said damper device further includes a resilient abutment (800) which limits and controls displacement of the shoe (400) relative to said first assembly (100).

29. A device according to claim 28, characterized by the fact that the resilient abutment (800) is made up of Belleville type spring washers.

30. A device according to claim 28, characterized by an fact that the axial clearance defined between the shoe (400) and said second assembly (100), together with a deformation of the resilient abutment (800) enable washers constituting the buckling resilient means to switch between two stable states during the active stage.

31. A device according to claim 28, characterized by the fact that the resilient abutment (800) is adapted to control friction force so as to stabilize the force on the shoe.

32. A device according to claim 28, characterized by the fact that said device possesses two equilibrium positions, one encouraging stiffening of the device, and the other encouraging relaxing of the device.

33. A device according to claim 28, characterized by the fact that the resilient abutment (800) is adapted to cause washers constituting the buckling resilient means to return automatically into a first equilibrium state.

34. An application of the damper device according to claim 1 to damping a force exerted by a barrel of a weapon.

35. An application according to claim 34, characterized by the fact that a stationary reference is constituted by a gun stock, grip, or carriage, while a system to be damped is formed by a gun barrel that is slidable relative to the stationary reference.

36. A damper device comprising a first assembly supported stationarily with respect to a reference, a second assembly supported for guided relative displacement with respect to said first assembly and said reference, means forming a driving connection between said second assembly and a movable system to be damped, a shoe spaced from said first assembly and movably and frictionally engaging said second assembly, resilient control means interposed between said shoe and said first assembly, said resilient control means exerting a force on said shoe to urge said shoe frictionally against said second assembly to dampen movement of said second assembly during an active stage of damper device loading corresponding to a first direction of movement of the second assembly and reducing force exerted on said shoe to reduce frictional engagement of the shoe against the second assembly to reduce damping movement of the second assembly during a passive stage of damper device loading corresponding to a second direction of movement of the second assembly, said resilient control means including a buckling part engaged between said shoe and said first assembly to exert a force on the shoe toward the second assembly when the second assembly is moved in said first direction of movement.

37. A device according to claim 36, characterized by the fact that said device further includes a force-limiter.

38. A device according to claim 37, characterized by the fact that the force-limiter comprises resilient members.

39. A device according to claim 36, characterized by the fact that said resilient control means comprise at least one spring washer.

40. A device according to claim 39, characterized by the fact that the force-limiter comprises at least one Belleville type spring washer.

41. A device according to claim 36, characterized by the fact that the resilient control means comprise at least one washer provided with radial slots that open to the periphery of said washer, alternately on the inside and on the outside.

42. A device according to claim 36, characterized by the fact that the resilient control means comprise a plurality of stacked spring washers.

43. A device according to claim 36, characterized by the fact that the resilient control means comprise a piece of elastomer.

44. A device according to claim 36, characterized by the fact that the shoe is formed by a split ring.

45. A device according to claim 36, characterized by the fact that the shoe is formed by a cylindrical element having an internal annular cavity.

46. A device according to claim 36, characterized by the fact that return means are provided urging the two assemblies towards a rest position.

47. A device according to claim 46, characterized by the fact that said return means are formed by a return spring.

48. A device according to claim 36, characterized by the fact that it further includes a resilient abutment which limits and controls displacement of the shoe relative to the first assembly.

49. A device according to claim 48, characterized by the fact that the resilient abutment is made up of Belleville type spring washers.

50. A damper device comprising a first assembly supported stationarily with respect to a reference, a second assembly supported for guided relative displacement with respect to said first assembly and said reference, means forming a driving connection between said second assembly and a movable system to be damped, a shoe spaced from said second assembly and movably and frictionally engaging said first assembly, resilient control means interposed between said shoe and said second assembly, said resilient control means exerting a force on said shoe to urge said shoe frictionally against said first assembly to dampen movement of said second assembly during an active stage of damper device loading corresponding to a first direction of movement of the second assembly and reducing force exerted on said shoe to reduce frictional engagement of the shoe against the first assembly to reduce damping movement of the second assembly during a passive stage of damper device loading corresponding to a second direction of movement of the second assembly, said resilient control means including a buckling part engaged between said shoe and said second assembly to exert a force on the shoe toward the first assembly when the second assembly is moved in said first direction of movement.

51. A device according to claim 50, characterized by the fact that said device further includes a force-limiter.

52. A device according to claim 51, characterized by the fact that the force-limiter comprises resilient members.

53. A device according to claim 50, characterized by the fact that said resilient control means comprise at least one spring washer.

54. A device according to claim 50, characterized by the fact that the resilient control means comprise at least one washer provided with radial slots that open to the periphery of said washer, alternately on the inside and on the outside.

55. A device according to claim 50, characterized by the fact that the resilient control means comprise a plurality of stacked spring washers.

56. A device according to claim 50, characterized by the fact that the resilient control means comprise a piece of elastomer.

57. A device according to claim 50, characterized by the fact that the force-limiter comprises at least one Belleville type spring washer.

58. A device according to claim 50, characterized by the fact that the shoe is formed by a split ring.

59. A device according to claim 50, characterized by the fact that the shoe is formed by a cylindrical element having an internal annular cavity.

60. A device according to claim 50, characterized by the fact that return means are provided urging the two assemblies towards a rest position.

61. A device according to claim 60, characterized by the fact that the return means are formed by a return spring.

62. A device according to claim 50, characterized by the fact that it further includes a resilient abutment which limits and controls displacement of the shoe relative to the second assembly.

63. A device according to claim 62, characterized by the fact that the resilient abutment is made up of Belleville type spring washers.

* * * * *